R. E. HELLMUND.
SYSTEM OF CONTROL.
APPLICATION FILED SEPT. 10, 1914.

1,264,299.

Patented Apr. 30, 1918.

WITNESSES:
R. J. Fitzgerald
W. R. Coley

INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,264,299.

Specification of Letters Patent.  Patented Apr. 30, 1918.

Application filed September 10, 1914. Serial No. 860,994.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Control, of which the following is a specification.

My invention relates to systems of control, and it has special reference to means for automatically converting a momentum-driven vehicle-propelling motor to a braking generator under predetermined conditions of the supply circuit and the machine circuit, or for automatically setting the air or other mechanical brakes under such conditions.

The object of my invention is to provide an apparatus of the above-indicated character which shall be simple and compact in construction, and reliable and effective in operation, whereby under emergency conditions, such as failure of the supply circuit energy, the vehicle may be safely retarded.

According to my invention, I provide a dynamo-electric machine having an armature and a field magnet winding, an auxiliary source of energy, a braking circuit, and means, in the form of a suitable relay switch, for automatically energizing the field winding from the source of energy, upon the failure of supply-circuit voltage, and having an actuating coil connected across the armature for either effecting the connection of the machine to the braking circuit upon the attainment of a predetermined speed and voltage of the momentum-driven armature, or, as a modification of my invention, for electromagnetically effecting the operation of the vehicle air brakes under the conditions referred to.

Figure 1:
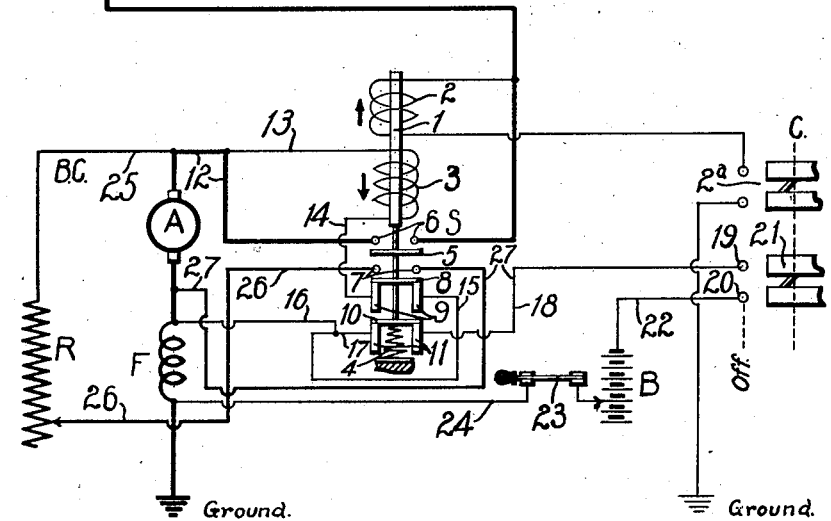
Figure 2:
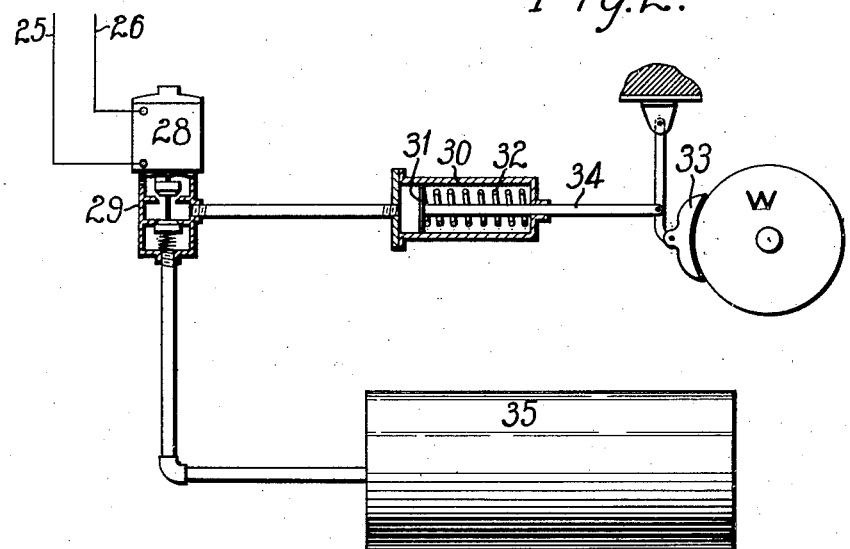

Figure 1 of the accompanying drawing is a diagrammatic view of a system of control embodying my invention; and Fig. 2 is a diagrammatic view of a modification of a portion of the system illustrated in Fig. 1.

Referring to Fig. 1 of the drawing, the system here shown comprises a suitable supply circuit including conductors respectively marked "Trolley" and "Ground"; a dynamo-electric machine having an armature A and series field magnet winding F; an auxiliary source of energy, such as a storage battery B; a braking circuit BC which preferably includes a suitable resistor R; a control switch C that is adapted to occupy an "off" and a plurality of operative positions; and a relay switch S.

The relay switch S comprises a suitable core member 1 that is adapted to be actuated upwardly by means of a coil 2 which is connected across the supply circuit through coöperating stationary and movable contact members 2$^a$ of the control switch C, in any operative position; a second actuating coil 3 which is adapted to move the core 1 downwardly when connected across the armature A, under predetermined voltage conditions thereof; a suitable spring member 4 for biasing the relay switch S to the intermediate position shown in the drawing; a movable contact member 5 which is adapted to engage a pair of stationary contact members 6 when the switch occupies its upper position and to engage a pair of contact members 7 in its lower position, a second movable contact member 8 which is adapted to engage a pair of stationary contact members 9 during the time that the switch occupies either its intermediate position shown in the drawing or its lower position; and a third movable contact member 10 which is adapted to engage a pair of stationary contact members 11 under similar conditions.

The relative operation of the actuating coil 2, the coil 3 and the spring member 4 may be briefly set forth as follows: When the motor is not operating, the spring 4 biases the relay switch S to the intermediate position illustrated; upon energization of the motor circuit and of the actuating coil 2 by movement of the control switch C to any operative position, the relay switch S is moved to its upper position; and, upon failure of supply circuit voltage, provided the electromotive force generated by the momentum-driven armature attains a predetermined value, the actuating coil 3 moves the switch, in opposition to the spring 4, to its lower position.

Assuming the parts to occupy the positions shown, the operation of my system may be described as follows: Upon actuation of the control switch C to any of its operative positions, the relay switch S is moved to its upper position, as hereinbefore described, whereupon a circuit is established from the trolley through coöperating contact members 5 and 6 of the relay switch, conductor 12 and the armature and field winding of the propelling motor to ground, thereby connecting the motor to the supply circuit for normal operation of any suitable type, as hereinafter pointed out.

Assuming the supply circuit energy to suddenly fail, for any reason, the relay switch S immediately assumes the position shown in the drawing, wherein a circuit is first established from conductor 12 through conductor 13, the actuating coil 3 of the relay switch S, conductor 14, coöperating contact members 8 and 9 of the switch, and conductors 15 and 16 to a point intermediate the armature A and field winding F. The coil 3 is thus connected directly across the armature A. Another circuit is simultaneously established from one side of the field F, through conductors 16 and 17, to operating contact members 10 and 11 of the relay switch, conductor 18, control fingers 19 and 20—which are bridged by a contact member 21 of the control switch C—conductor 22, a predetermined portion of the battery B, a manually operated switch 23, and conductor 24 to the opposite side of the field F, to energize it in the opposite direction to that which the current took during acceleration, for a purpose which will be well understood. The battery B is thus connected to energize the field winding F, provided the control switch C occupies any operative position, to effect a building up of the generated voltage of the momentum-driven armature A. In case the armature speed and, therefore, the voltage, attains a predetermined value, the force exerted by the actuating coil 3 of the switch S becomes sufficient to overcome the action of the spring member 4, and the relay switch S is moved to its lower position, in which, in addition to the connections already established, a new circuit is completed from one side of the armature A through conductor 25, resistor R, and conductor 26 of the braking circuit BC, and through coöperating contact members 5 and 7 of the relay switch S, and conductor 27 to the other side of the armature. The braking circuit BC is thus connected across the armature to set up dynamic braking thereof, the rate of retardation of the vehicle being readily varied by suitable manipulation of the resistor R.

Inasmuch as the particular system employed for accelerating the motor is not relevant to my present invention, I have not deemed it necessary to describe any particular system, and it will be understood that any suitable means for accelerating the vehicle-propelling motor may be employed.

Since the actuating coil 2 of the relay switch S and the circuit of the battery B are connected through the control switch C in any of its operative positions, it will be observed that, when it is desired to voluntarily discontinue the operation of the motor, and the control switch is returned to its off position, the relay switch S is allowed to assume its intermediate position shown on the drawing and the battery B is not connected across the field winding F. The system described therefore, operates automatically only under predetermined emergency conditions.

Reference may now be had to Fig. 2, wherein is shown a fluid-pressure, such as air-braking, system of a familiar form that is adapted to serve a similar purpose to the braking resistor R, under emergency conditions. The apparatus illustrated comprises the conductors 25 and 26, which are connected to the respective ends of an actuating coil 28 of a normally closed magnet valve 29; an air cylinder 30, an operating piston 31 therefor, and a helical spring 32 that is disposed within the cylinder 30 to bias the piston 31 to an extreme and inoperative position; a brake shoe 33 that is suitably mechanically associated with the piston rod 34 for engaging a vehicle wheel W; and an air tank or reservoir 35 for admitting air through the valve 29 to the cylinder 31 when the valve is actuated.

Assuming that the armature speed and the voltage attains the predetermined values above referred to, the operation of the apparatus may be described as follows: When the actuating coil 28 of the valve 29 is sufficiently energized from the armature A to effect the opening of the valve, fluid-pressure is admitted to the cylinder 30 to actuate the piston 31 in opposition to the action of the spring 32, thereby causing the brake shoe 33 to engage the wheel W and brake the vehicle.

It will be appreciated that both types of the automatic system shown may be employed in a single vehicle, if desired.

I do not wish to be restricted to the specific circuit connections and arrangement of parts herein set forth, but desire that only such limitations shall be imposed as are indicated in the appended claims.

I claim as my invention:

1. In a control system, the combination with a supply circuit, and a dynamo-electric machine adapted to be connected thereto, of means active only upon a failure of supply-circuit energy and upon subsequent machine-circuit conditions for automatically effecting the braking of said machine.

2. In a control system, the combination with a supply circuit, and a dynamo-electric machine adapted to be connected thereto and having an armature and a field magnet winding, of means active upon a failure of supply circuit energy and upon subsequent increased voltage conditions of the momentum-driven armature for effecting the braking of said machine.

3. In a control system, the combination with a supply circuit, and a dynamo-electric machine adapted to be connected thereto and having an armature and a field magnet winding, of an auxiliary source of energy, and means dependent upon a failure of supply-circuit energy and upon subsequent voltage conditions of the momentum-driven armature for energizing said field winding from said auxiliary source for electromagnetically effecting the braking of said machine.

4. In a control system, the combination with a supply circuit, and a dynamo-electric machine adapted to be connected thereto and having an armature and a field magnet winding, of an auxiliary source of energy, and means dependent upon a failure of supply-circuit energy and upon a predetermined machine speed for energizing said winding from said source of energy and for concurrently electromagnetically effecting the braking of said machine.

5. In a system of control, the combination with a supply circuit, and a dynamo-electric machine adapted to be operated therefrom, of means active only upon a failure of supply-circuit energy and upon subsequent machine-circuit conditions for causing said machine to act as an electric brake.

6. In a system of control, the combination with a supply circuit, and a dynamo-electric machine adapted to be operated therefrom, and having an armature and a field magnet winding, of an auxiliary source of energy, and means dependent upon predetermined emergency machine-circuit conditions only for automatically energizing said field winding from said auxiliary source to effect dynamic braking of said machine.

7. In a system of control, the combination with a supply circuit, and a dynamo-electric machine adapted to be operated therefrom and having an armature and a field magnet winding, of an auxiliary source of energy, a braking circuit, and means dependent upon a predetermined variation of supply-circuit, and of machine-circuit, voltage for automaticallly energizing said field winding from said source of energy and for concurrently connecting said machine to said braking circuit.

8. In a system of control, the combination with a supply circuit, and a dynamo-electric machine adapted to be operated therefrom and having an armature and a field magnet winding, of an auxiliary source of energy, a braking circuit, and means dependent upon a failure of supply-circuit energy and upon subsequent machine-circuit conditions for energizing said field winding from said source of energy and for concurrently connecting said machine to said braking circuit.

9. In a system of control, the combination with a supply circuit, and a dynamo-electric machine adapted to be operated therefrom and having an armature and a field magnet winding, of means active upon a failure of supply-circuit energy and upon subsequent increased voltage conditions of the momentum-driven armature for effecting dynamic braking of said machine.

10. In a system of control, the combination with a supply circuit, and a dynamo-electric machine adapted to be operated therefrom and having an armature and a field magnet winding, of means active only upon a predetermined variation of supply-circuit voltage and upon a predetermined machine speed for causing said machine to act as an electric brake.

11. In a system of control, the combination with a supply circuit and a dynamo-electric machine adapted to be operated therefrom and having an armature and a field magnet winding, of means active only upon a failure of supply-circuit energy and upon the attainment of a predetermined machine speed for effecting dynamic braking of said machine.

12. In a system of control, the combination with a supply circuit, and a dynamo-electric machine adapted to be operated therefrom and having an armature and a field magnet winding, of an auxiliary source of energy, and means dependent upon a failure of supply-circuit energy and upon subsequent voltage conditions of the momentum-driven armature for energizing said field winding from said auxiliary source and for effecting dynamic braking of the machine 13. In a system of control, the combination with a supply circuit, and a dynamo-electric machine adapted to be operated therefrom and having an armature and a field magnet winding, of an auxiliary source of energy, a braking circuit, and means dependent upon a failure of supply-circuit energy and upon a predetermined machine speed for energizing said field winding from said source of energy and for concurrently connecting said machine to said braking circuit.

14. In a system of control, the combination with a supply circuit, and a dynamo-electric machine adapted to be operated therefrom and having an armature and a field magnet winding, of an auxiliary source of energy, a braking circuit, a relay switch having an actuating coil adapted for connection across said armature, means associated with said switch for connecting said auxiliary source of energy in circuit with said field winding upon a predetermined variation of supply-circuit energy, and other means associated with the switch for subsequently connecting the machine to the braking circuit under predetermined circuit conditions.

15. In a system of control, the combination with a supply circuit, and a dynamo-electric machine adapted to be operated therefrom and having an armature and a field magnet winding, of an auxiliary source of energy, a braking circuit, a relay switch having an actuating coil adapted for connection across said armature, means associated with said switch for connecting said auxiliary source of energy in circuit with said field winding upon a failure of supply-circuit energy, and other means associated with the switch for subsequently connecting the machine to the braking circuit upon the attainment of the predetermined speed and voltage of the machine armature.

16. In a vehicle-control system, the combination with a supply circuit and a dynamo-electric machine adapted to be fed therefrom, of relay means dependent upon predetermined supply-circuit conditions for automatically interrupting the supply-circuit connection of the machine and dependent upon subsequent machine-speed conditions for inaugurating a vehicle-retarding action.

17. In a vehicle-control system, the combination with a supply circuit and a dynamo-electric machine adapted to be fed therefrom, of means active only upon a predetermined variation of supply-circuit conditions and a subsequent variation of machine-speed conditions for respectively interrupting the supply-circuit connection of the machine and for inaugurating a vehicle-retarding action.

18. In a control system, the combination with a supply circuit, and a dynamo-electric machine adapted to be connected thereto, of means dependent upon a predetermined variation of supply-circuit voltage and an opposite variation of machine-circuit voltage for automatically effecting the braking of said machine.

19. In a control system, the combination with a supply circuit, and a dynamo-electric machine adapted to be operated therefrom, of means dependent upon a predetermined decrease of supply-circuit voltage and an increase of machine-circuit voltage for automatically effecting the braking of said machine.

20. In a system of control, the combination with a supply circuit, and a dynamo-electric machine adapted to be connected thereto, of means for normally governing the operation of said machine, and other means dependent upon a failure of supply-circuit voltage and upon subsequent machine-circuit conditions for effecting the braking of said machine while said governing means occupies an operative position.

21. In a system of control, the combination with a supply circuit, and a dynamo-electric machine adapted to be operated therefrom, of means for normally governing the operation of said machine, and other means dependent upon a failure of supply-circuit energy and upon subsequent machine-circuit conditions for causing said machine to act as an electric brake while said governing means occupies an operative position.

In testimony whereof, I have hereunto subscribed my name this 28th day of Aug., 1914.

RUDOLF E. HELLMUND.

Witnesses:
W. A. CLARK,
B. B. HINES.